United States Patent

Gladigow et al.

[11] Patent Number: 5,609,297
[45] Date of Patent: Mar. 11, 1997

[54] FUEL ATOMIZATION DEVICE

[75] Inventors: Herbert Gladigow; Wolfgang Schaetzing, both of Magdeburg, Germany

[73] Assignee: Texas Instruments Incorporated, Dallas, Tex.

[21] Appl. No.: 420,267

[22] Filed: Apr. 11, 1995

[30] Foreign Application Priority Data

Apr. 12, 1994 [DE] Germany .......................... 44 12 448.1

[51] Int. Cl.⁶ .......................... B05B 1/24; F02M 31/125
[52] U.S. Cl. .......................... 239/135; 123/298; 123/549; 392/491
[58] Field of Search .......................... 239/135; 219/205; 392/485, 491, 473; 123/298, 543, 547, 549

[56] References Cited

U.S. PATENT DOCUMENTS

| 3,265,865 | 8/1966 | Hager, Jr. .......................... | 392/491 X |
| 4,245,589 | 1/1981 | Ryan .......................... | 123/298 |
| 4,572,146 | 2/1986 | Grunwald et al. .......................... | 123/298 X |
| 4,603,667 | 8/1986 | Grunwald et al. .......................... | 123/543 X |
| 5,040,497 | 8/1991 | Dingle .......................... | 123/549 X |
| 5,050,569 | 9/1991 | Beunk et al. .......................... | 123/549 |
| 5,054,458 | 10/1991 | Wechem et al. .......................... | 123/547 X |
| 5,400,969 | 3/1995 | Keene .......................... | 239/135 X |
| 5,519,191 | 5/1996 | Ketcham et al. .......................... | 392/485 X |

FOREIGN PATENT DOCUMENTS

| 317-382 | 5/1989 | European Pat. Off. .......................... | 123/543 |
| 427-262 | 5/1991 | European Pat. Off. .......................... | 123/543 |
| 2300894 | 7/1979 | Germany . | |
| 56-6056 | 1/1981 | Japan .......................... | 123/549 |

*Primary Examiner*—Lesley D. Morris
*Attorney, Agent, or Firm*—Russell E. Baumann; Richard L. Donaldson; Rene'E. Grossman

[57] ABSTRACT

A fuel atomization device 10 is provided for an internal combustion engine having a fuel injection system with fuel injectors 15. The fuel atomization device is sealingly secured on a nozzle lip of the fuel injector nozzle. The device includes a base 1 in which a plurality of heating elements and profiled vaporizer contact baffles 3 are arranged in a sandwich-like manner. Vaporizer chambers 8 are formed between the heating elements 2 and the vaporizer contact baffles 3 for providing a passage for the fuel through the base 1. The fuel undergoes a rise in temperature and pressure while in the device; and as it exits the device at fuel outlet 6, it is atomized fuel at a lower pressure.

6 Claims, 4 Drawing Sheets

5,609,297

FUEL ATOMIZATION DEVICE

BACKGROUND OF THE INVENTION

This invention relates to a device for atomization of fuel in combustion engines and more particularly, the atomization of fuel in combustion engines having fuel injection systems.

It has been known in the prior art to use the retrograde effect of fuel.

DE-OS 2800894 describes a process which utilizes the properties of retrograde substances. Succinctly stated, in order to convert a retrograde substance such as gasoline into the gaseous state, the substance is brought to a specific temperature and a specific initial pressure and is then reduced to a lower specific end pressure with the initial temperature being so chosen that the gasoline at the lower pressure state is in a gaseous state. These retrograde substances do not absorb heat from the general surrounding when entering the gaseous state.

The principle of the atomization or vaporization of retrograde substances by heating under high pressure in the liquid phase and subsequent adiabatic or polytropic relief of the pressure has diverse applications. The end pressure can, for example, be the chamber pressure in a combustion engine or the atmospheric pressure in a combustion chamber of a furnace.

In the case of combustion engines, it is advantageous to heat the fuel before injection into the cylinder or the prechamber of the engine.

The above referred to German OS reference also describes a system for carrying out the process, but the system proposed in this document, despite an integrated non-return valve, has the drawback of the possible formation of a vapor lock in the injection valve. Additionally, the system is not intended for dynamic, demand-responsive control of the fuel heating in accordance with the particular characteristic-dependent engine operation state, with the result that the efficiency is necessarily considerably impaired, especially in transitional states.

It has also been customary to preheat the fuel/air mixture to reduce the cold start and warm-up emissions and to improve the performance.

For example, a number of fuel mixture heating devices (early fuel evaporators) have been used, many of which use positive temperature coefficient (PTC) ceramic heaters to heat one or more metal heating elements arranged in the intake manifold of the engine. The heating elements are suffused with an atomized fuel and/or fuel/air mixture. Due to structural reasons and air flow considerations, these devices have not proved altogether satisfactory, especially in the case of multi-port injection systems. More specifically, these devices have heat exchange capacity shortcomings and cause fluid flow losses for the engine. The problem of an unavoidable fluidic mismatch of the heating device in the intake manifold necessarily results therefrom, and gives rise to a significant loss in maximum output of the engine.

SUMMARY OF THE INVENTION

Accordingly, it is an object of the present invention to provide a device for improved atomization of fuel.

It is a further object of the present invention that the device for improved atomization of fuel is electrically operated and has an extremely low thermal time constant.

It is still a further object of the present invention that the device for improved atomization of fuel can be fitted or retrofitted on a conventional injector valve.

More specifically, a device for the atomization of fuel, according to the present invention, comprises a housing having a fuel inlet orifice and a fuel outlet orifice and a fuel passage means for connecting said inlet and said outlet orifices, heating elements contained within said housing, contact baffle means for supplying electric power to said heating elements, said contact baffle means forming a plurality of narrow restricting cavities directly adjacent said heating elements for increasing the pressure of the fuel flowing in said housing along with heating of said fuel so as to produce atomized fuel upon exiting from said outlet orifice.

Additionally, in accordance with another aspect of the present invention, the heating elements and contact baffle means are arranged in a sandwiched unit which can be pressure fitted into the housing of the device due to the elasticity of the contact baffle means to ensure firm sealing of the unit in the housing.

BRIEF DESCRIPTION OF THE DRAWINGS

Other objects, advantages and details of this invention appear in the following detailed description of the preferred embodiments of the invention, the detailed description referring to the drawings in which.

DESCRIPTION OF THE PREFERRED EMBODIMENTS

Figure 1:
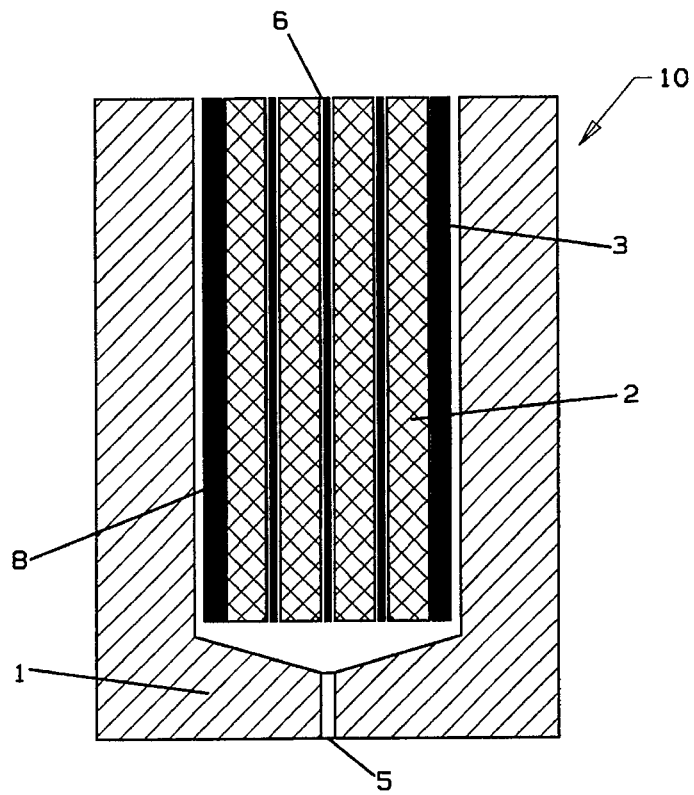
FIG. 1 is a cross-sectional view of the device of the present invention.
Figure 2:
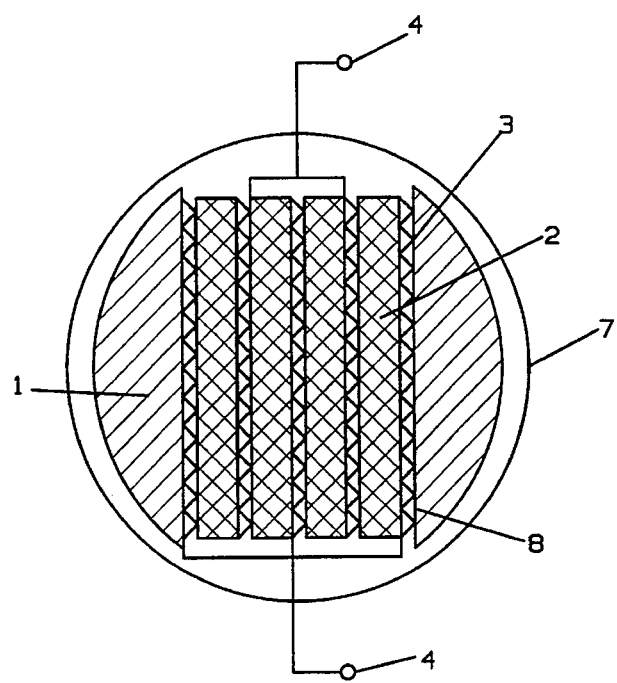
FIG. 2 is a plane view of the device of FIG. 1.

FIG. 1 shows the construction and design of a device 10 of the present invention for atomization of fuel. Device 10 is constructed as a compact assembly including a base 1 in which heating elements 2 and vaporizer contact baffles 3 are arranged alternatively and in layers forming a sandwiched unit. Typically, heating elements 2 are positive temperature coefficient (PTC) ceramic heaters having a high Curie temperature although bimetallic foil-type heaters or thick-film heaters on thin substrates could be used. Vaporizer contact baffles 3 typically are of a profiled design and, as shown by FIG. 2, have a zigzag shape. It is also possible for the vaporizer contact baffles 3 to be of a different profile design such as of a corrugated and/or honeycomb structure. Further, the baffles can be made from a bimetallic material to help in controlling power loss in the device when the power is off by increasing the flow gap.

The essential feature is that a multiplicity of vaporizer chambers 8 are formed between heating elements 2 and vaporizer contact baffles 3 as a result of the profiling of the vaporizer contact baffles. The vaporizer contact baffles are electrically conductive and supply heating elements 2 with power via a power feed 4.

A casing 7, which is located around base 1, ensures protection of the device from external causes and prevents fuel from flowing from the sides of the device.

Figure 3:
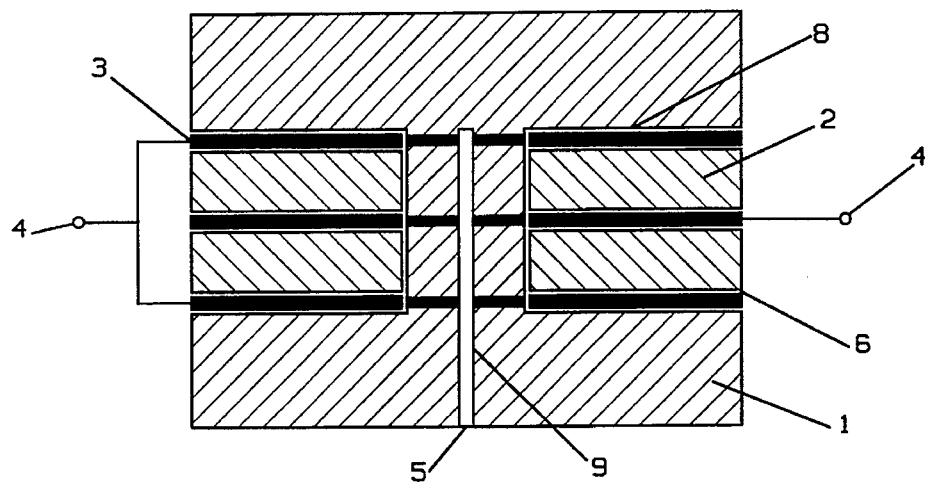
FIG. 3 is a cross-sectional view of a device of the present invention with radially arranged baffles.

FIGS. 1 and 2 illustrate the arrangement of heating elements 2 and vaporizer contact baffles 3 in the axial or longitudinal direction, whilst a radial arrangement is shown in FIG. 3. Both in the longitudinal arrangements of heating elements 2 and vaporizer contact baffles 3 and in their radial arrangement, the vaporizer contact baffles 3 are of profiled design and in both embodiments also have additional openings in order to further increase the circulating flow effect.

With this arrangement, the profiling of vaporizer contact baffles 3 ensures, on the one hand, that numerous vaporizer chambers 8 are provided, through which fuel flows between inlet orifice 5 and the rectangular atomized fuel outlet 6, and on the other hand, also as a result of their elasticity, to provide firm seating of the sandwich unit in base 1. The vaporizer contact baffles 3 also act as electrical contacts for heating elements 2 and form the connection for the power feeds 4.

Figure 4:
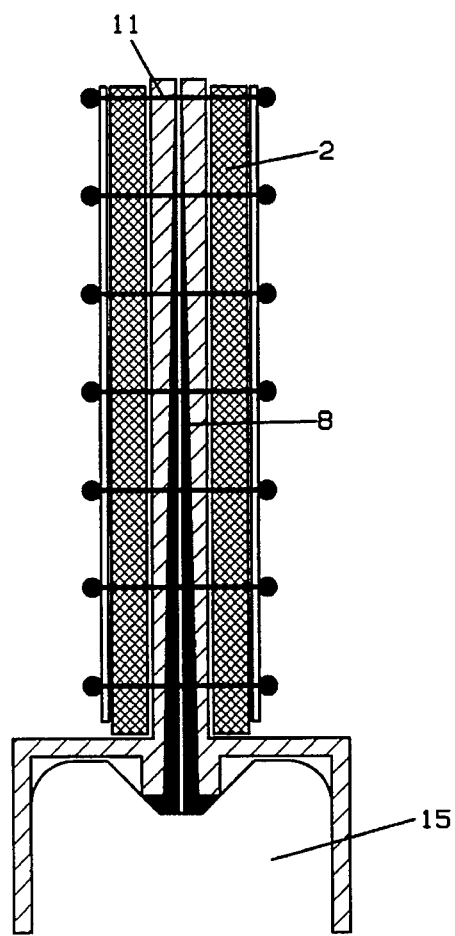
FIG. 4 is a cross-sectional view of another embodiment device of the present invention attached to an injector unit.
Figure 6:
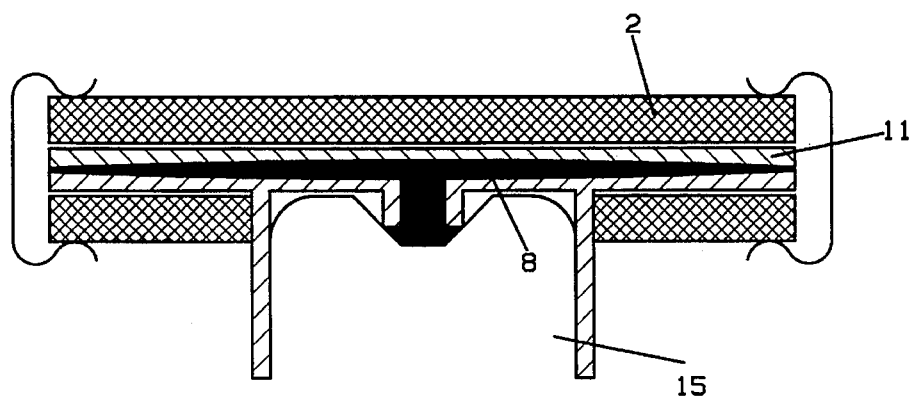
FIG. 6 is a cross-sectional view of a further embodiment of a device of the present invention attached to an injector unit.
Figure 7:
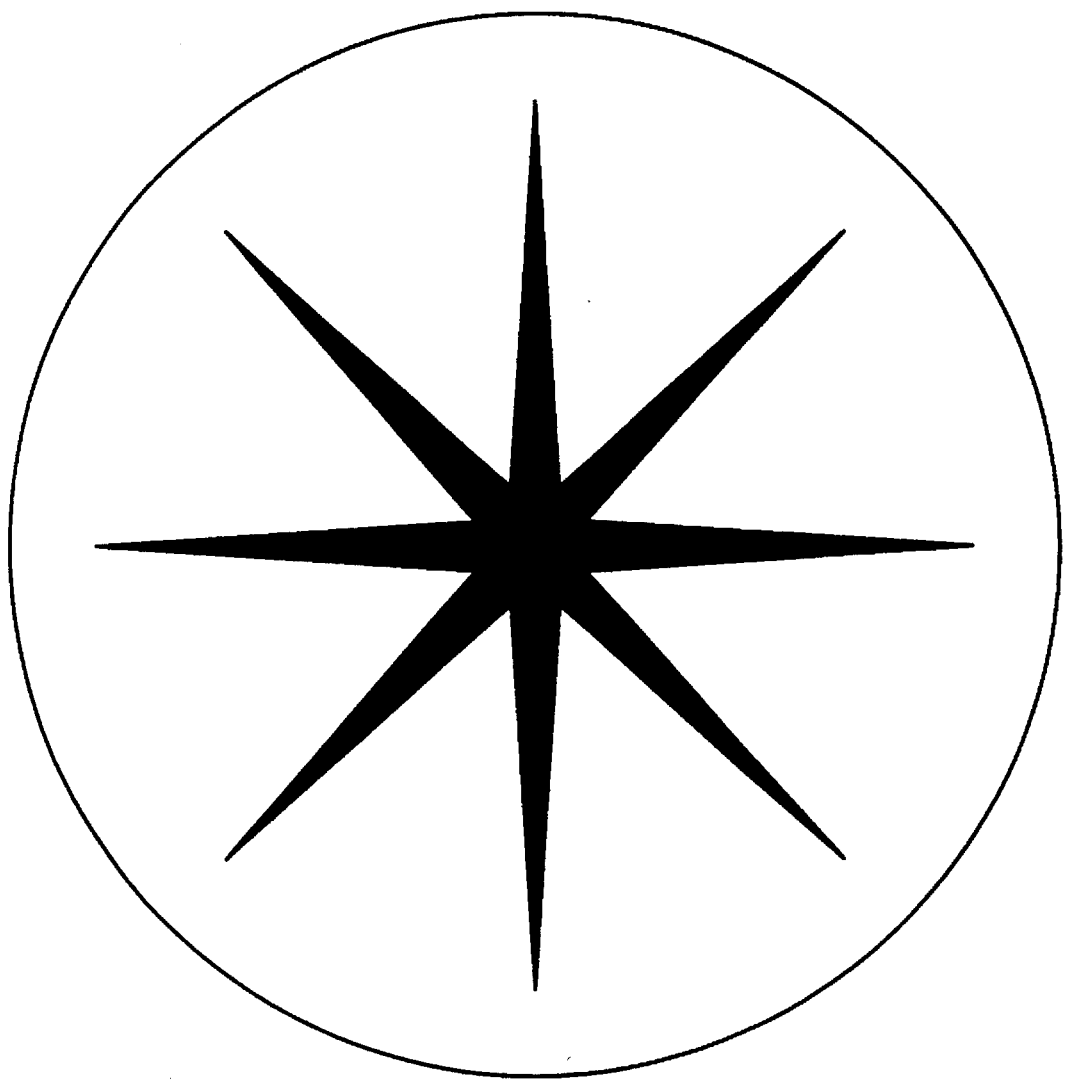
FIG. 7 is a diagrammatical representation of dispersed fuel from the device of FIG. 6.

FIGS. 4 and 6 show a variation of the device of the present invention for both an axial design (FIG. 4) and a radial design (FIG. 6) in which the chamber 8 is a narrow gap (the size of 30 micron in certain applications). These designs use only two PTC heater elements 2 without the necessity of the contact baffles 3. Adjacent chamber 8 on both sides is a heat sink member 11 which in turn is in direct contact with PTC heater elements 2. Electrical power is provided to the PTC heater elements 2 from a power feed.

Figure 5:
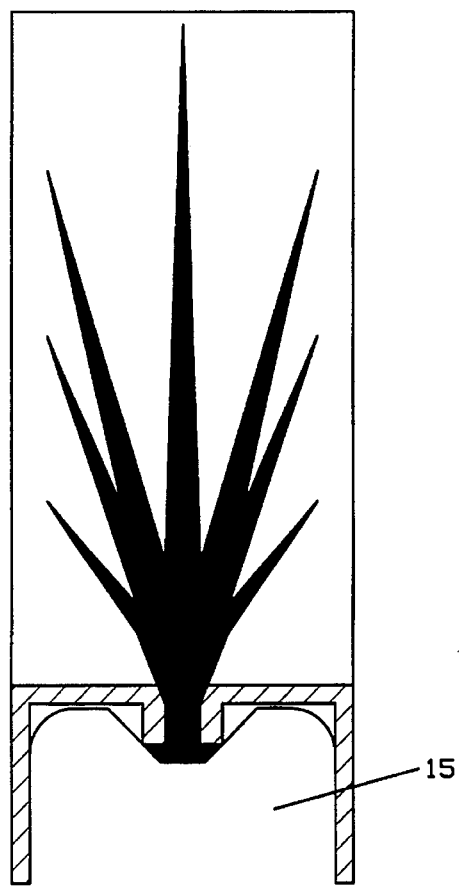
FIG. 5 is a diagrammatical representation of dispersed fuel from the device of FIG. 4.

The operation of the atomization device will be described below:

Typically, the atomization device (FIGS. 1 and 2) is fitted or attached, in a pressure-sealed manner, directly on a nozzle tip of a fuel injection unit 15 (shown in FIGS. 4–6). The fuel to be atomized flows through inlet orifice 5 and then guided by the path provided by vaporizer contact baffles 3, flows over the PTC heating elements 2 in the longitudinal direction. During this process, an increase in pressure of the fuel is provided by the flow in the narrow vaporization chambers (30 microns in certain applications) which due to the retrograde effect fuel results in atomized fuel from outlet 6 due to the pressure drop at this point with no absorption of heat from the environment. This dispersal of fuel is diagrammatically shown in FIGS. 5 and 7.

In the case of the radial arrangement of heating elements 2 and profiled vaporizer contact baffles 3 shown in FIG. 3, the fuel enters the atomization device through the inlet orifice 5 and through a fuel duct 9 and flows around the vaporizer contact baffles 3 and heating elements 2 in the same manner as described above, but in the radial direction.

Vaporization takes place in the narrow slit-shape vaporizer chamber 8, and the fuel, which is under pressure, issues from the atomized fuel outlet 6, which is shaped as cylinder jacket.

The pressure conditions inside base 1 are such that a flow resistance is built-up in the interior of base 1 as the fuel to be atomized flows through it. This flow resistance is chosen to provide a fluid pressure inside the base of a valve required for initiation of the retrograde effect on the fuel exiting from the base.

The device, according to this invention, is designed to have low mass, which in conjunction with a dynamically optimized heating characteristic leads to extremely short heating times for the fuel. This provides for engine operating requirements with minimal need for fuel enrichment, even upon cold start of the engine. The result is the operation of the engine and emissions associated herewith that are similar to those occurring from an engine running at normal operating temperature.

Certain advantages of the present invention lie, inter alia, in the fact that:

- conventional injector valves can be fitted or retrofitted with the fuel atomization device according to the present invention;
- heat elements can be used as elements forming the vaporization chambers and thereby making it possible to obtain optimal design configurations; and
- the fuel spray from the injector and device of the present invention is unaffected and reaches the originally intended target area in the intake duct of the engine.

This invention has been described above with reference to the aforementioned embodiments. It is evident, however, that many alternative, modification and variations will be apparent to those skilled in the art in light of the foregoing description. Accordingly, it is intended to embrace all such alternatives, modifications and variations as fall within the spirit and scope of the appended claims.

We claim:

1. A device for the atomization of fuel for a combustion engine adapted for use with an injector of a fuel injection system comprising a housing having a fuel inlet orifice and a fuel outlet orifice and a fuel passage means for connecting said inlet and outlet orifices, heating elements contained within said housing, contact baffle means for supplying electric power to said heating elements, said contact baffle means forming a plurality of narrow restricting cavities directly adjacent said heating elements for increasing the pressure of the fuel flowing in said housing along with heating of said fuel so as to produce atomized fuel upon exiting from said outlet orifice.

2. A device of claim 1 wherein said contact baffle means includes a plurality of profiled contact baffles for forming said narrow restricting cavities.

3. A device of claim 2 wherein said plurality of profiled contact baffles are in a generally zigzag shape.

4. A device of claim 1 wherein said heating elements and said contact baffle means are arranged in a sandwich form being pressure fitted in said housing.

5. A device of claim 1 wherein said heating elements are chosen from the group consisting of PTC heaters, bimetallic foil-type heaters, and thick film heaters on substrates.

6. A device for the atomization of fuel for a combustion engine adapted for use with an injector of a fuel injection system comprising a housing having a fuel inlet orifice and a fuel outlet orifice, a passage means for connecting said inlet and outlet orifices, heating element means contained within said housing, contact means for supplying electrical power to said heating element means and a narrow gap passageway between said heating element means contained in said passage means for increasing the pressure of the fuel along with the heating by said heating element means so as to produce atomized fuel upon exiting from said outlet orifice.

* * * * *